UNITED STATES PATENT OFFICE.

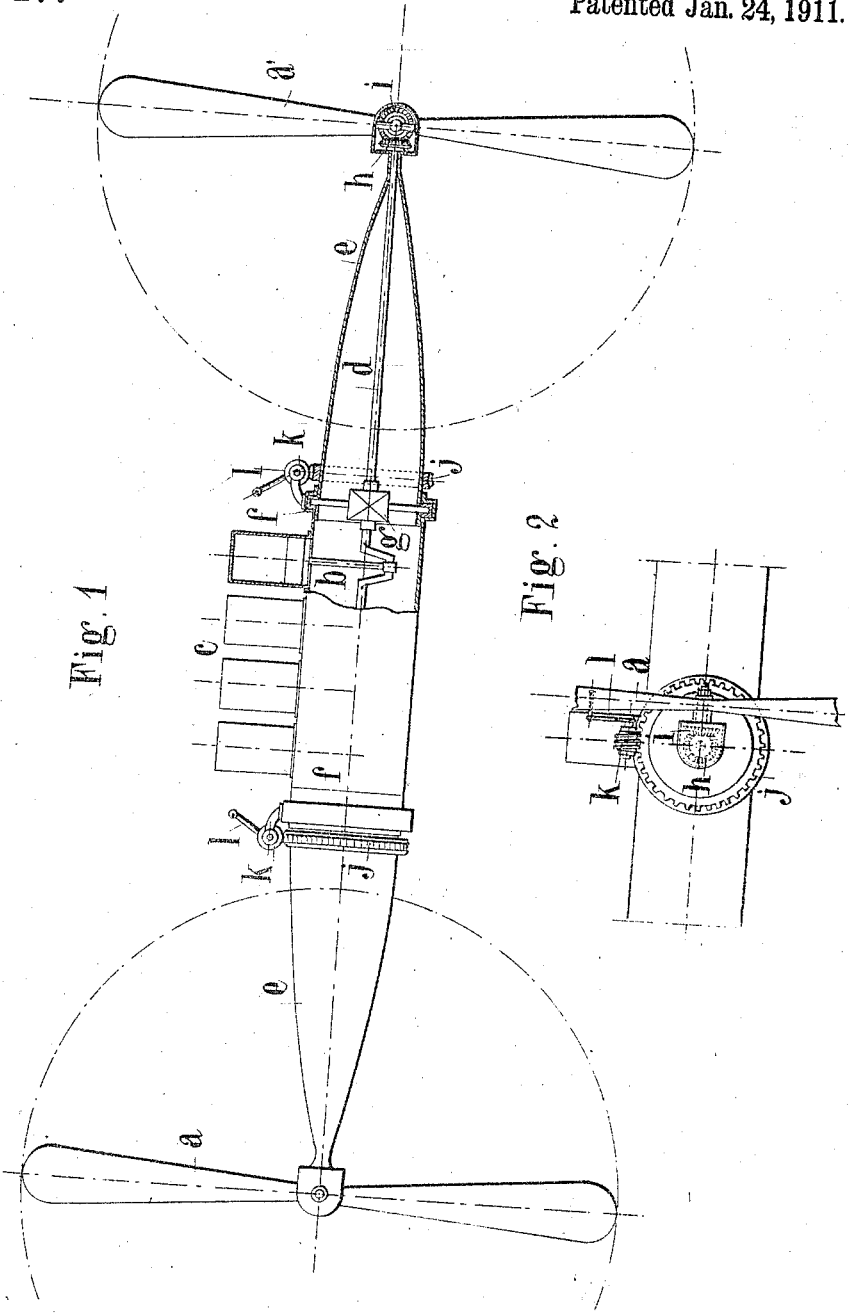

MELVIN VANIMAN, OF GENNEVILLIERS, FRANCE.

PROPELLING MECHANISM FOR AIRSHIPS.

982,647. Specification of Letters Patent. Patented Jan. 24, 1911.

Application filed May 3, 1909. Serial No. 493,658.

*To all whom it may concern:*

Be it known that I, MELVIN VANIMAN, a citizen of the United States of America, and resident of Gennevilliers, Seine, France, have invented new and useful Improvements in Propelling Mechanism for Airships, which improvements are fully set forth in the following specification.

The subject matter of this invention is an arrangement of screws applicable to dirigible balloons and to aeroplanes, these screws serving for the propulsion of the said balloons or aeroplanes in a horizontal plane, and allowing, when occasion arises, of their ascent and descent by moving in oblique planes.

The screw device is represented, by way of example, in the annexed drawings.

Figure 1 is a view, partly in elevation, partly in vertical section: Fig. 2 is an end view.

The device, the whole arrangement of which is shown in Fig. 1, is mounted on the car perpendicularly to the longitudinal median plane of the balloon. It contains one or two screws $a$ $a'$, which in the latter case, are mounted symmetrically one on each side of the car. Each one of the screws $a$, $a'$ is connected to the crank shaft $b$ of a motor $c$ which is suitably mounted upon the car, by means of an intermediate shaft $d$ passing through an arm $e$. The arm $e$, which is of conical shape, carries at its extremity a box forming a bearing in which the shaft of the screw revolves, the large end of the said arm being disposed within a part of the crank case $f$ of the motor, which is adapted to retain it and at the same time to allow its rotation on its axis, which coincides with the axis of the crank shaft and with that of the intermediate shaft. A suitable coupling means $g$ unites the shafts $b$ and $d$. The movement of the motor is transmitted to each of the screws $a$ $a'$ through a bevel wheel $h$ mounted upon the extremity of the shaft $d$ and engaging with another bevel wheel $i$ mounted on the propeller shaft.

The device for imparting a certain rotary movement around the axis $d$ to the arms $e$, carries for each arm a crown with helicoidal teeth which is rigidly connected thereto, an endless screw $k$ fixed in any suitable manner upon the gear case $f$, engaging with the said teeth. A crank $l$ or other device is adapted to impart to the screw $k$, by hand or by means of some actuating device, the rotary movement necessary for the displacement of the arm.

In starting the motor, assuming that the screw propellers $a$, $a'$ are mounted as shown in Fig. 1, that is to say, with their planes of gyration strictly vertical, it is obvious that these screws will operate as actuating elements to displace the balloon in a horizontal plane. According to the direction of rotation of the screws, it is possible to obtain an advance, or return movement. On the other hand, if the cranks $l$ or other suitable elements are operated to impart a certain angular displacement to the arms $e$, the planes of gyration of the screws become oblique and the propulsion of the balloon is effected in a vertical plane in a direction corresponding to an oblique line parallel with the extended axes of the screws. The balloon rises or descends according as the arms $e$ are caused to turn in one or the other direction, and the degree of inclination of the progress of the balloon is accentuated proportionately to the angular displacement given to the said arms.

If the screw propellers are inclined either forward or backward, the horizontal displacement of the balloon can still be obtained: if, in fact, for example, owing to the warmth of the atmosphere the lifting power of the balloon increases, it is still possible to effect the horizontal displacement of the balloon by directing the screws so as to produce a descending movement; if, on the other hand, the lifting power diminishes in consequence of a cooling of the atmosphere, the horizontal displacement of the balloon can still be brought about by directing the screws so as to produce an ascending effect.

Hitherto only a case in which the two arms $e$, and, consequently, the two screws $a$, $a'$, are displaced simultaneously has been dealt with, but it is obvious that in order to obtain certain steadying effects any one of the screws may be inclined in the direction suitable for readjusting the balloon. All the described devices can, however, be arranged to allow of the simultaneous displacement of the arms $e$ in the same direction or in opposite directions, or of one arm to the exclusion of the other, in the same manner as to vary the direction of movement of the screws independently of one another.

Claim.

Mechanism for causing the elevation and depression of propelling screws for dirigible balloons and aeroplanes, said mechanism comprising a tubular crank case having open ends, tubular members rotatably mounted on the ends of the crank case and alined therewith, a crank shaft extending longitudinally through the crank case and tubular members, a plurality of engine cylinders supported directly on the crank case, pistons operating therein, pitmen connecting the pistons and cranks of the crank shaft, and propellers mounted on the ends of the tubular members and geared directly to the ends of the crank shaft.

In testimony whereof I have signed this specification in the presence of two subscribing witnesses.

MELVIN VANIMAN.

Witnesses:
 EMILE LEDRET,
 DEAN B. MASON.